United States Patent [19]
Fritzinger et al.

[11] Patent Number: 5,714,815
[45] Date of Patent: Feb. 3, 1998

[54] MOTOR MOUNT ASSEMBLY

[75] Inventors: Daniel D. Fritzinger, Grabill; Steven M. Cummins, Fort Wayne, both of Ind.

[73] Assignee: Mattel, Inc., El Segundo, Calif.

[21] Appl. No.: 523,364

[22] Filed: Sep. 5, 1995

[51] Int. Cl.$^6$ ................................................. H02K 5/00
[52] U.S. Cl. ........................ 310/89; 310/71; 446/431; 180/8.1; 180/8.6; 180/65.6; 180/65.7
[58] Field of Search .................... 310/89, 71; 446/431; 180/8.1, 8.6, 65.6, 65.7

[56] References Cited

U.S. PATENT DOCUMENTS

| | | | |
|---|---|---|---|
| D. 324,866 | 3/1992 | Pleet et al. | D15/5 |
| 3,622,822 | 11/1971 | Lofstrand | 310/89 |
| 3,733,744 | 5/1973 | Hiltpold et al. | 46/243 |
| 3,911,304 | 10/1975 | Seely | 310/242 |
| 3,985,322 | 10/1976 | Mabuchi et al. | 248/5 |
| 4,109,398 | 8/1978 | Hida | 35/13 |
| 4,475,618 | 10/1984 | Kennedy et al. | 180/237 |
| 4,516,648 | 5/1985 | Berger et al. | 180/6.66 |
| 4,561,514 | 12/1985 | Yamada et al. | 180/8.6 |
| 4,730,134 | 3/1988 | Sistare | 310/50 |
| 4,840,242 | 6/1989 | Chih et al. | 180/8.1 |
| 4,869,700 | 9/1989 | Reiling, Jr. et al. | 446/90 |
| 4,889,516 | 12/1989 | Auer et al. | 446/462 |
| 4,979,582 | 12/1990 | Forster | 180/20 |
| 5,045,013 | 9/1991 | Fujitani | 446/179 |
| 5,287,029 | 2/1994 | Krouse | 310/89 |

Primary Examiner—Clayton E. LaBalle
Assistant Examiner—Elvin G. Enad
Attorney, Agent, or Firm—Kolisch, Hartwell, Dickinson, McCormack & Heuser

[57] ABSTRACT

A gear box and motor mount assembly for non-rotatably holding an electric motor for driving a gear train in a children's riding vehicle includes an enclosure having two halves shaped to non-rotatably hold the motor therein, and a boss in the vehicle's gear box to non-rotatably receive the enclosure so that the motor, and more specifically a pinion thereon may drive the gear train. In the preferred embodiment, the halves are hingedly joined and define a clam shell-like enclosure, and the boss on the gear box is generally cylindrical and includes a cavity for receiving the enclosure. Key structure on the enclosure, and a complementary-formed slot adjacent the cavity in the boss for receiving the key structure ensures that the enclosure is non-rotatably secured in the boss for driving the gear train.

16 Claims, 3 Drawing Sheets

MOTOR MOUNT ASSEMBLY

BACKGROUND AND SUMMARY OF THE INVENTION

This invention relates to children's riding vehicles, and more particularly to a motor mount assembly for use in a motor-driven children's riding vehicle.

Children's riding vehicles of the type which include a small direct current motor for driving the vehicle have been around for some time. Generally, these vehicles include a frame, plural wheels rotatably mounted on the frame, a gear box on the frame for holding plural driven gears, and a small, battery-powered motor for driving the gears to drive the vehicle. The motor employed in such vehicles will typically include mounting bosses which are generally sandwiched between one or more plates in the gear box, which keep the motor fixed relative to the gear box, so that it may properly drive the gears.

This method of mounting a motor in a gear box is undesirable for a number of reasons. First, assembly of the gear box is complicated by the need to physically sandwich the motor between two or more plates. This means that there are more parts of which to keep track during assembly of the vehicle. Moreover, because two or more additional parts are needed to sandwich the motor, there must be relatively tight tolerances between the parts to ensure that all of the parts properly align. If the tight tolerances are not observed, then when the gear box and motor are assembled, the motor will not engage the gear train properly.

Thus a significant need exists for a simplified way of mounting a motor in a gear box in a children's riding vehicle.

With the above problems in mind, it is a general object of the invention to provide a motor mount assembly which greatly simplifies assembly of a children's riding vehicle.

It is another object of the invention to reduce the tight tolerances necessitated by present motor-mounting methods.

It is another object of the invention to provide a motor mount assembly which may be used interchangeably among children's riding vehicles of many different types.

In brief summary, the invention achieves these and other objects in the form of a motor mount for non-rotatably holding an electric motor in a children's riding vehicle, the motor being used for driving gears in a gear train connected to the vehicle's wheels. The mount includes an enclosure defined by two halves shaped to non-rotatably hold the motor therein, and a holder in the vehicle's gear box to non-rotatably receive the enclosure so that the motor, and more specifically a pinion thereon may drive the gear train. In the preferred embodiment, the two halves are hingedly joined and define an elongate, clam shell-like enclosure and the holder on the gear box is generally in the shape of a frustum having a cavity for receiving the enclosure. Key structure on the enclosure, and a complementary-formed slot adjacent the cavity in the holder for receiving the key structure ensure that the enclosure is non-rotatably secured in the holder for driving the gear train.

DETAILED DESCRIPTION OF THE PREFERRED EMBODIMENT

Figure 1:
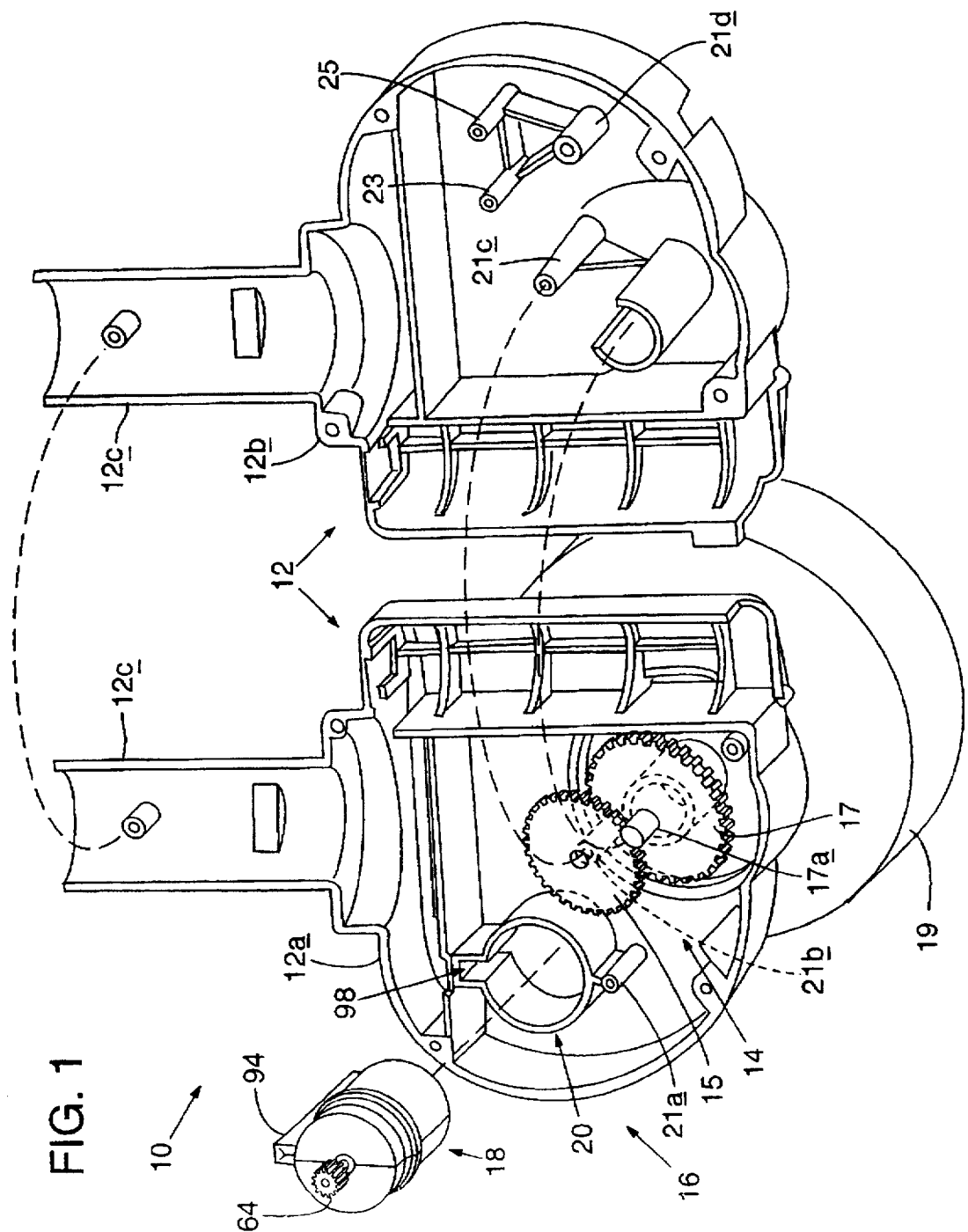
FIG. 1 is an isometric view of two halves of a gear box and a motor mount assembly according to the preferred embodiment of the present invention.

FIG. 1 shows a gear box housing and motor mount assembly for use in a children's riding vehicle according to the preferred embodiment of the present invention, generally at 10, where it may be seen to include a housing 12 having first and second halves 12a, 12b. The housing halves define a gear box 14, having inside walls 14a, 14b, for enclosing a gear train, two gears of which are shown at 15, 17 where it will be understood that gear 15 is an intermediate driven gear and gear 17 is a so-called output gear which is non-rotatably connected to an output axle shaft 17a which in turn is nonrotatably connected to one or more of the vehicle's wheels, one of which is shown at 19. A suitable children's vehicle in which the present invention may be incorporated for use is disclosed in U.S. patent application Ser. No. 08/450,376, filed May 25, 1995 by Fritzinger et al. which is assigned to Mattel, Inc., the present assignee of this application, the disclosure of which is hereby incorporated by reference.

A motor mount shown generally at 16, includes a motor enclosure 18 and generally cylindrical wall structure defining a holder 20 mounted on inside wall 14a of first half 12a of gear box 14 for non-rotatably receiving enclosure 18 and holding a motor driving the gear train. The housing and motor mount are preferably constructed from molded plastic and include integrally-formed wells for receiving the gear pins upon which the gears of the gear train are rotatably mounted. For example, wells 21a, 21b, 21c and 21d may be seen (21a, 21b being formed in first half 12a, and 21c, 21d being formed in second half 12b) internally of gear box 14. When the housing halves are matably joined, such as by suitable screws received in peripherally-disposed apertures which are not specifically labelled, it will be appreciated that wells 21a and 21d are brought together to hold a gear pin (not shown) which in turn holds a driven gear which is not shown, but will be understood to be driven by a motor pinion 64. Similarly, wells 21b and 21c are brought together to hold a gear pin (not shown) upon which gear 15 is mounted. Located above well 21d in second half 12b are two so-called mounting bosses 23, 25 which abut enclosure 18 to keep it firmly in place within holder 20 when halves 12a, 12b are connected together. In the preferred embodiment of the present invention, housing 12, in addition to providing a mount for the above-described gear train, defines a generally vertically-extending shaft 12c (both portions of the shaft in each housing half are designated 12c) which provides a mount for a steering wheel which is not specifically shown but will be understood to enable a child rider to steer the vehicle. It will be understood, however, that the motor mount and gear train may be mounted elsewhere on the vehicle.

Figure 2:
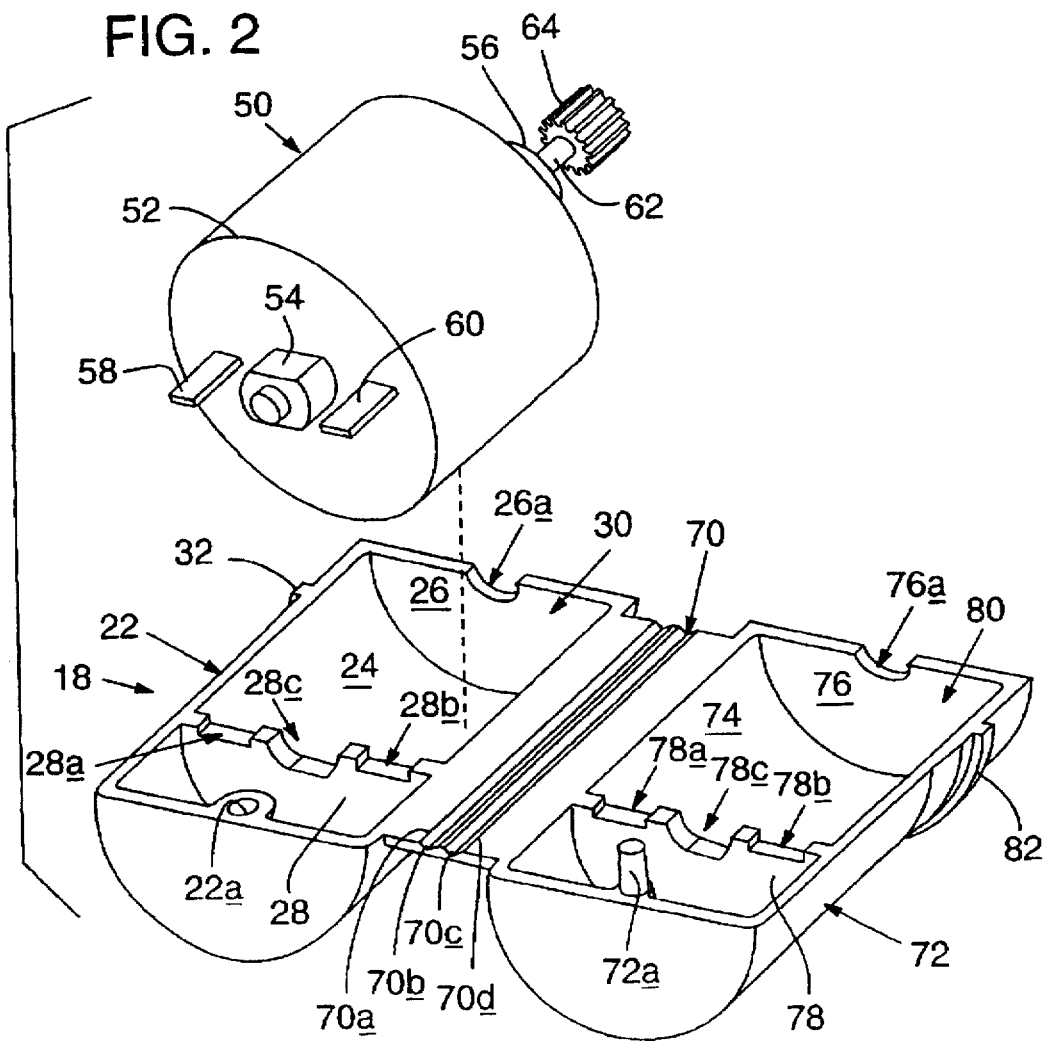
FIG. 2 is an isometric view of the enclosure of the motor mount assembly of FIG. 1, shown in an open position for receiving an adjacent motor.
Figure 3:
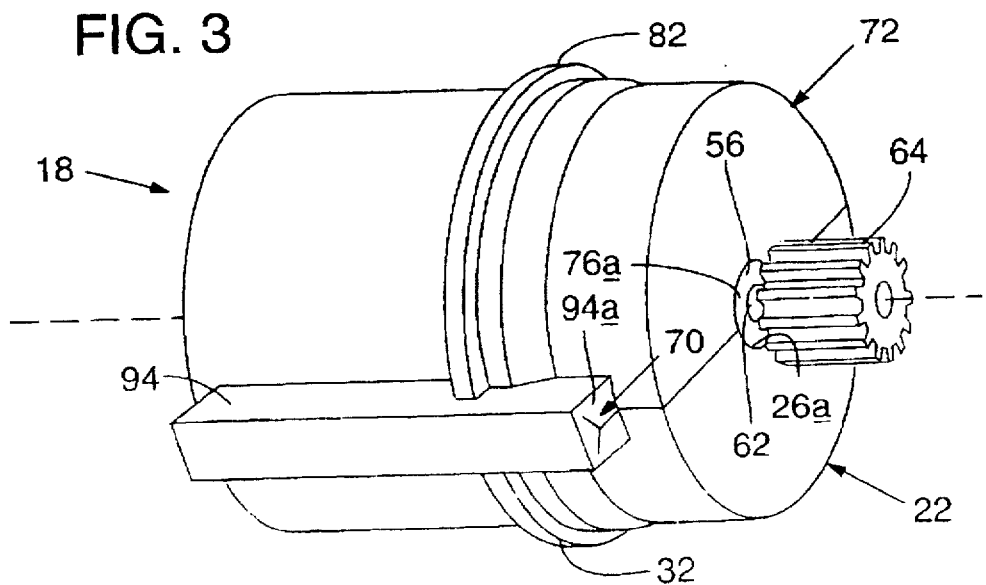
FIG. 3 is an isometric view of the enclosure of the motor mount in FIG. 2, only shown in the closed position, substantially encasing a motor.

FIGS. 2 and 3 show enclosure 18 as including a first half 22 and a second half 72 hingedly joined thereto along a seam 70 to define a clam shell-like enclosure for non-rotatably holding a motor 50 which is shown adjacent and above enclosure 18 in FIG. 2. The motor 50 includes an outer casing 52 and plural bosses 54, 56. Adjacent bass 54, two contacts 58, 60 are mounted and provide an electrical connection for a battery (not shown), which supplies power to drive the motor and hence the vehicle. Extending away from boss 56, a drive shaft 62 may be seen to include a pinion 64 non-rotatably mounted thereon for driving the vehicle's gears. Halves 22, 72 may be joined or connected in any suitable manner to enclose motor 50, and are preferably formed in the joined-together configuration during the fabrication of enclosure 18, as by injection molding. The halves may also be separate and held together by suitable clips, tangs, snap fittings, slotted engagement fittings, and the like.

Seam 70, as shown in FIG. 2, includes plural longitudinally-disposed wall portions 70a, 70b, 70c, 70d, which are joined together and define the hinge or seam which joins halves 22, 72. Wall portions 70a–70d form what appears to be a letter "W" as viewed head-on in FIG. 2.

First half 22 may be seen on the left side of seam 70 in FIG. 2 and includes a generally semi-cylindrical wall 24 bounded by walls 26, 28 as shown to define a first cavity 30 for receiving motor 50. Wall 26 includes a recess 26a for receiving boss 56 on motor 50, and wall 28 includes plural recesses 28a, 28b for receiving contacts 58, 60 on motor 50, and a recess 28c therebetween generally conformably-shaped to non-rotatably receive boss 54 on motor 50. An aperture 22a is provided for receiving a complementary-shaped detent 72a on half 72, when halves 22, 72 are closed together.

Second half 72 is generally a mirror image of first half 22, and is joined thereto along seam 70 described above, and includes a generally semi-cylindrical wall 74 bounded by walls 76, 78 to define a second cavity 80 which substantially encloses or encases motor 50 when halves 22, 72 are closed therearound as shown in FIG. 3. Wall 76 includes a recess 76a for receiving holder 56 on motor 50, and wall 78 includes plural recesses 78a, 78b for receiving contacts 58, 60 on motor 50, and a recess 78c therebetween, generally conformably-shaped to non-rotatably receive boss 54 on motor 50. Detent 72a is provided for engaging aperture 22a as described above. An annular rim extends substantially around the perimeter of enclosure 18, and is most easily seen in FIG. 3, the rim being defined by a semi-annular rim 32 on first half 22, and a semi-annular rim 82 on second half 72.

When enclosure 18 is in a closed position, it defines a generally elongate cylinder for enclosing motor 50, and the recesses described above fit snugly around the motor's bosses for non-rotatably holding the motor therein. For example, FIG. 3 shows recesses 26a, 76a snugly fitting around motor boss 56. In the closed position, key structure or portion 94 may be seen longitudinally-disposed along the outside of enclosure 18 adjacent seam 70. Key structure 94, which assumes a generally elongated rectangular or square shape, may be seen in FIG. 3 to be defined by the confluence of wall portions 70a–70d in FIG. 2 when halves 22, 72 are brought together. Key structure 94 includes a side 94a which shows wall portions 70a–70d defining what may be considered a letter "Y" when structure 94 is viewed longitudinally from either end.

Figure 4:
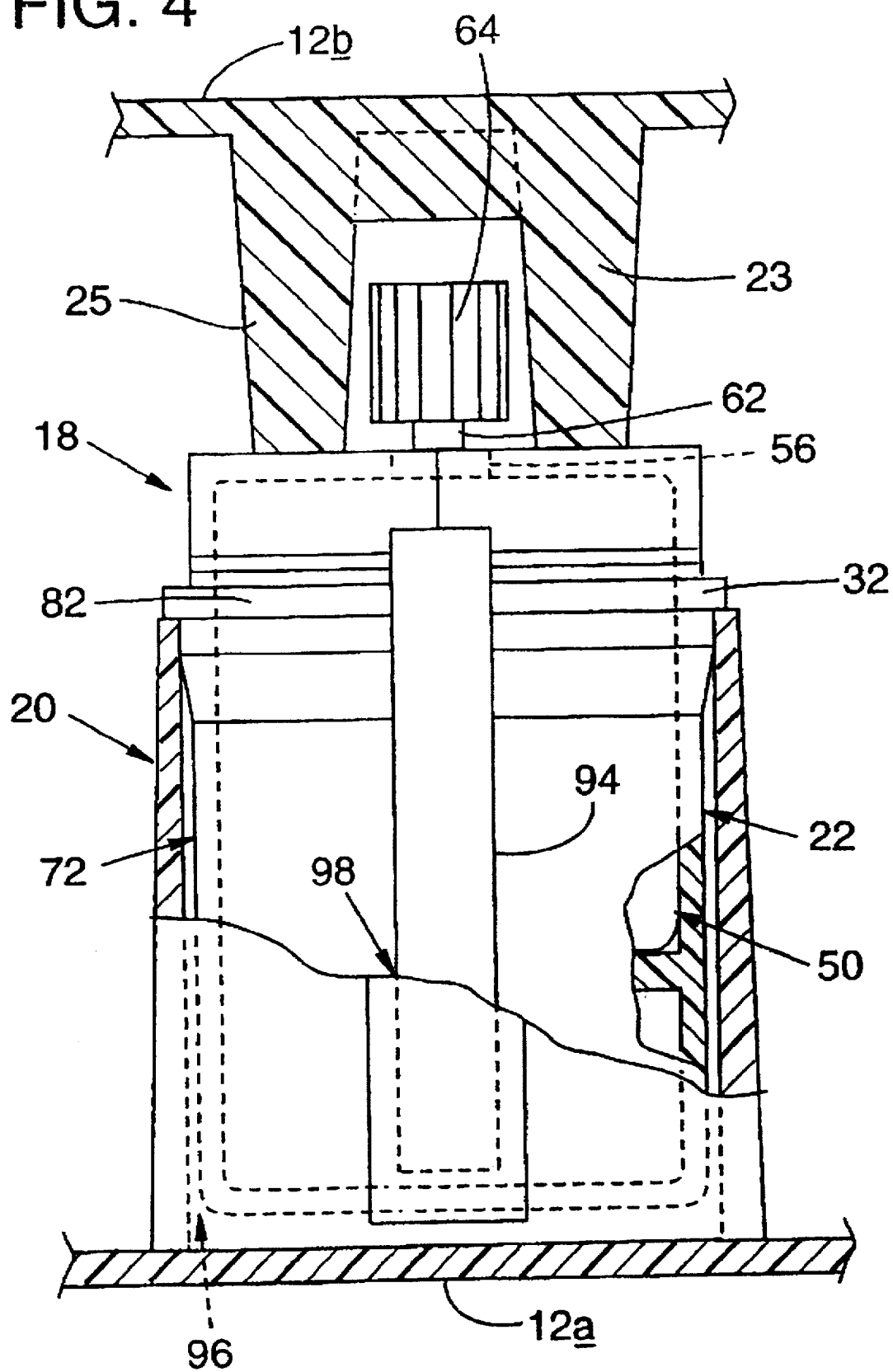
FIG. 4 is a top plan view of the motor mount assembly in place within a holder in the gear box, showing key structure on the enclosure and a complementary-formed slot in the holder, a portion being broken away for clarity.

FIG. 4 shows a fragmented portion of first and second halves 12a, 12b of housing 12 which define gear box 14 (FIG. 1) where it may be seen that holder 20, which is preferably cylindrical as described above, is joined thereon and includes a generally longitudinally-disposed cavity 96 having a longitudinally-disposed slot 98 (also shown in FIG. 1) adjacent thereto. As shown in FIG. 4, a portion of the wall forming holder 20 has been removed for clarity and to show key structure 94 on enclosure 18 in the relative position it occupies when enclosure 18 is inserted into holder 20. It should be apparent that key structure 94 fits within slot 98 so that any tendency of the enclosure to rotate when the motor is energized is eliminated. Additionally, a portion of enclosure 18 has been removed to show motor 50 in a so-called motor-enclosing portion of the enclosure. Near the top of key structure 94 as viewed in FIG. 4, semi-annular rims 32, 82 defining the annular rim described above, may be seen to engage holder 20 so as to limit the extent to which enclosure 18 may be inserted into cavity 96. When enclosure 18 has been inserted as shown and halves 12a, 12b mounted together, mounting bosses 23, 25 abut enclosure 18 pressing it firmly in place and holding it within cavity 96.

IN OPERATION

The motor mount assembly just described, provides a means which greatly simplifies the assembly of children's riding vehicles, by moving toward a more modularized construction which reduces the need for compliance with tight tolerances. Moreover, the modular construction enables interchangeability among riding vehicles of varying types.

During assembly, motor 50 need simply be inserted into one of the two clam shell halves 22, 72, with the motor's mounting bosses 54, 56 non-rotatably secured by the recesses described above. By closing halves 22, 72 together, enclosure 18 may be inserted into cavity 96 in holder 20 in the gear box. Key structure 94 on the enclosure and a complementary-formed slot 98 in holder 20 for receiving the key structure, ensure that the enclosure remains non-rotatably mounted in the gear box for driving the gears of the vehicle. When halves 12a, 12b of housing 12 are brought together and connected, and enclosure 18 is in place in cavity 96, mounting bosses 23, 25 on the interior of the gear box abut enclosure 18, as shown in FIG. 4, and hold it firmly in place.

While a preferred embodiment of the invention has been described, it will be appreciated that variations and modifications thereto are possible without departing from the spirit and scope of the invention.

We claim:

1. A gear box housing and motor mount assembly for use in a children's riding vehicle having an electric motor for driving a gear train in the vehicle comprising:

a housing defining a gear box for enclosing the gear train, the housing having an inside wall;

an enclosure having first and second halves for non-rotatably receiving the motor, the enclosure being closeable to substantially encase the motor and hold it non-rotatably therein; and a holder, mounted on the inside wall of the housing, for receiving the enclosure, and further wherein the enclosure includes a portion that cooperates with the holder so that the enclosure is non-rotatably held by the holder in the gear box adjacent the gear train.

2. The assembly of claim 1, wherein the first and second halves are hingedly joined to define a clam shell-like enclosure.

3. The assembly of claim 2 wherein the housing includes first and second housing halves and the holder is disposed in the first housing half, and further comprising a mounting boss in the second housing half for holding the enclosure firmly in the holder.

4. The assembly of claim 1, wherein the holder defines a cavity for receiving at least a portion of the enclosure.

5. The assembly of claim 4, wherein the holder includes a slot adjacent the cavity, and the enclosure includes key structure which is insertable into the slot when the enclosure is inserted into the cavity, for non-rotatably fixing the enclosure's position in the cavity.

6. The assembly of claim 4, wherein the enclosure includes an annular rim which engages the holder so as to limit the extent to which the enclosure may be inserted into the cavity.

7. The assembly of claim 2, wherein the enclosure is generally elongate.

8. The assembly of claim 7, wherein the enclosure is generally cylindrically-shaped.

9. In a children's riding vehicle having a frame, wheels rotatably mounted on the time, plural driven gears and an output gear non-rotatably connected to at least one of the vehicle's wheels, a gear box housing and motor mount assembly comprising:

a an enclosure for non-rotatably holding an electric motor for driving the gears, the enclosure including a first half defining a first cavity for receiving the motor; and a second half defining a second cavity, wherein the second half is connectable to the first half for defining an enclosure for substantially encasing the motor and holding the same non-rotatably therein, the motor having a shaft extending outwardly from the motor mount and a pinion non-rotatably mounted thereon for driving the vehicle's gears, and further wherein the enclosure is non-rotatably mountable in the vehicle.

10. The assembly of claim 9, wherein the first and second halves are hingeably joined and define a clam shell-like enclosure.

11. The assembly of claim 10 further comprising a housing on the frame defining a gear box for enclosing the plural driven gears, the output gear, and the enclosure.

12. The assembly of claim 11, wherein the housing includes an inside wall and further comprising a holder on the inside wall for non-rotatably holding the enclosure defined by the first and second halves.

13. The assembly of claim 12, wherein the holder is generally cylindrically-shaped and includes a cavity for receiving the enclosure.

14. The assembly of claim 13, wherein the holder includes a slot adjacent the cavity and joined thereto, and the enclosure includes key structure which is insertable into the slot for non-rotatably holding the enclosure in the cavity.

15. A motor mount for use in a children's riding vehicle having a gear box, for non-rotatably holding an electric motor in the gear box, comprising:

a holder on the gear box defining a cavity;

a first half; and a second half hingedly connected to the first half, wherein the halves are closeable and define a clam shell-like enclosure for substantially enclosing the motor, and wherein when the halves are closed the mount defines a generally elongate cylindrical enclosure, and further wherein the enclosure is non-rotatably mountable in the holder.

16. The mount of claim 15, wherein the holder is elongate and generally cylindrical and includes a longitudinally-disposed slot adjacent the cavity, and wherein the enclosure includes key structure for engaging the slot when the enclosure is inserted into the cavity for non-rotatably holding the enclosure in the cavity.

* * * * *